United States Patent
Khanna et al.

(10) Patent No.: US 6,343,330 B1
(45) Date of Patent: Jan. 29, 2002

(54) ARRANGEMENT FOR PREVENTING LOOPING OF EXPLORER FRAMES IN A TRANSPARENT BRIDGING DOMAIN HAVING MULTIPLE ENTRY POINTS

(75) Inventors: Arun Girdharilal Khanna; Arunkumar Bhushappagala Thippeswamy, both of Cupertino; Frank Gerard Bordonaro; Patricia Ann Webster, both of Los Gatos, all of CA (US); Scott Allen Bales, Durham, NC (US); Uwe Sellentin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/318,432

(22) Filed: May 25, 1999

(51) Int. Cl.[7] .............................................. G06F 15/16
(52) U.S. Cl. ..................... 709/249; 709/227; 370/401; 370/404; 370/405
(58) Field of Search .............................. 709/227, 249, 709/225, 220; 370/401, 404, 405

(56) References Cited

U.S. PATENT DOCUMENTS 5,914,953 A * 6/1999 Krause et al. ............... 370/392
6,061,728 A * 5/2000 Mead et al. ................. 709/227
6,064,675 A * 5/2000 Alexander, Jr. et al. .... 370/401
6,119,162 A * 9/2000 Li et al. ...................... 709/227

* cited by examiner

Primary Examiner—Krisna Lim
(74) Attorney, Agent, or Firm—Leon R. Turkvich (57) ABSTRACT

A transparently-bridged wide area network connecting Ethernet/IEEE 802.3-based local area networks uses redundant proxy devices on each LAN for internetwork communications. The proxy devices, implemented as data link switching (DLSw) devices, prevent looping of traffic such as explorer frames by sharing their MAC addresses to enable the proxy devices to recognize data packets from another proxy device. Incoming explorer frames from the wide area network are modified by performing an address substitution, where the source address in a received explorer frame is replaced with the address of the local proxy device. The proxy device then outputs the modified explorer frame onto the local area network. Any other proxy device on that same local network will then be able to detect the modified explorer frame as a frame forwarded by another proxy device, as opposed to a data frame from an end station on that local area network. Hence, redundant DLSw-type proxy devices may be implemented on a local area network while maintaining a stable and a robust communications system.

35 Claims, 3 Drawing Sheets

ARRANGEMENT FOR PREVENTING LOOPING OF EXPLORER FRAMES IN A TRANSPARENT BRIDGING DOMAIN HAVING MULTIPLE ENTRY POINTS

BACKGROUND OF THE INVENTION

1. Field of the Invention

The present invention relates to transparent bridging technology, more particularly to arrangements for providing transparent bridging between local area networks having multiple proxy devices serving as entry points for communication across a wide area network.

2. Description of the Related Art

Transparent bridging technology is a popular mechanism for interconnecting local area networks. Transparent bridges, popular in Ethernet/IEEE 802.3 Networks, are so named because their presence and operation are transparent to network hosts. When transparent bridges are powered on, they learn the network topology by analyzing the source address of incoming frames from all attached networks. If, for example, a bridge sees a frame arrive on line 1 from host A, the bridge concludes that host A can be reached through the network connected to line 1. Through this process, transparent bridges build a table that can be used for traffic forwarding.

Once the bridge has built a forwarding table, the bridge can forward a frame, received on one of the bridge ports, by looking up the frame's destination address in the forwarding table. If the forwarding table contains an association between the destination address and any bridge port other than the inbound port having received the frame, the bridge outputs the frame on the indicated port. If no association is found, the frame is flooded to all ports except the inbound port.

A design assumption with transparent bridging is for any particular media access control (MAC) address at any particular time, there will be at most one path through the transparent bridged network by which that MAC address can be reached. This design assumption is typically implemented through the use of the spanning-tree algorithm, which detects and eliminates any loops created by two or more transparent bridges by causing a sufficient number of bridge ports to enter a "blocking" mode. By eliminating all loops in the network, the only way a MAC address could be reachable through the multiple paths would be if more than one device advertised the same MAC address; since it is a violation of the IEEE 802.3 specification for an individual MAC address to be used by more than one device within a bridged network, the reachability of a MAC address by multiple paths is normally not an issue.

A limitation of transparent bridging technology is that there is no information contained within a packet to inform the bridge device the path from where the packet came, or the path to where the packet is destined. For example, the IEEE 802.5 token ring LAN specification describes source-route bridging (SRB) as a technique for bridging local area networks. Source-route bridging algorithms add the complete source-to-destination route in all inter-LAN frames sent by the source, such that all source route bridges store and forward the frames as indicated by the route appearing in the appropriate frame field.

Figure 1:
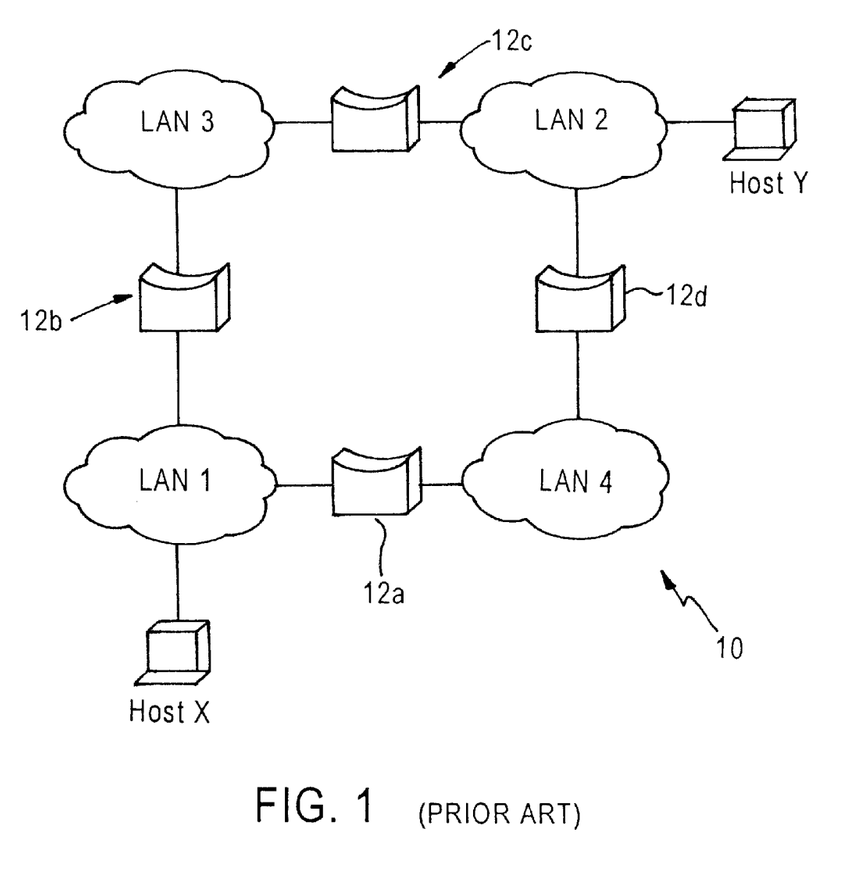
FIG. 1 is a block diagram of a conventional internetwork using source route bridging for interconnection of token ring-based local area networks.

FIG. 1 is a diagram illustrating an exemplary source-route bridged network 10. Assume that host X in FIG. 1 wishes to send a frame to host Y, and that initially host X does not know whether host Y resides on the same token ring (IEEE 802.5) local area network (LAN 1) or a different LAN segment. Hence, host X sends out a test frame onto LAN 1. If the test frame traverses around the token ring of LAN1 and returns to host X without a positive indication that host Y has seen the test frame, host X assumes that host Y is on a remote LAN segment. Different techniques may be used to learn a route through a source-route bridge, for example all-route explorers or single-route explorers. In the case of all-route explorers, host X sends an explorer frame to determine the remote location of host Y. Each bridge 12a, 12b receiving the explorer frame copies the frame onto all outbound ports. Route information is added to the explorer frames as they travel through the internetwork 10 via bridges 12c and 12d. When the explorer frames initially generated by host X reach host Y on LAN2, host Y replies to each received explorer frame using the accumulated route information. Upon receipt of all response frames that specify their respective paths, host X chooses a path based on predetermined criteria.

The route information is accumulated in a routing information field (RIF), specified under IEEE 802.5. A RIF is included only in those frames destined for other LANs, and the presence of routing information within the frame is indicated by the setting of the most significant bit within the source address field, called the routing information indicator (RII) bit.

As readily apparent from the foregoing, a limitation of transparent bridging technology is that there is no RIF functionality in IEEE 802.3 based networks, hence there is no information contained within a packet to inform the bridge device from where the packet came, or to where the packet is destined. This limitation is readily apparent from conventional Ethernet IEEE 802.3 networks as a packet will only have one path through a network.

New mechanisms have been developed for reliable transfer of traffic from an Ethernet IEEE 802.3 local area network across a wide area network. The consequences of these advances is that limitations which were not crucial for local operation of the Ethernet/802.3 local area network have become more cumbersome. For example, there are certain devices (e.g., and stations) in the network, referred to as "proxies", which represent a large number of other devices (e.g., end stations) elsewhere in the network; traffic destined for these end stations are accepted by the proxies, and traffic from these end stations enter the transparently bridged LAN through these proxies. One common example of this type of proxy device is a data link switching (DLSw) peer device, as described in RFC 1795.

Data link switching (DLSw) was developed as a means of transporting IBM Systems Network Architecture (SNA) and Network Basic Input/Output System (NetBIOS) traffic over a IP Network. The DLSw serves as an alternative to source route bridging protocols that were used for transporting SNA and NetBIOS traffic in token ring environments. The principal difference between source route bridging and DLSw revolves around support of local termination. SNA and NetBIOS traffic rely on link-layer acknowledgements and keep-alive messages to ensure the integrity of connections and the delivery of data. For connection-oriented data, the local DLSw node or router terminates data-link control. Therefore, link-layer acknowledgments and keep-alive messages do not need to traverse a wide area network. DLSw nodes or routers use a switch-to-switch protocol (SSP) for establishment and maintenance of DLSw circuits across a wide area network. The DLSw nodes encapsulate packets in TCP/IP for transport on IP based networks, using TCP as a means of reliable transport between DLSw nodes.

The use of DLSw type proxy devices does not create a problem in conjunction with transparent bridging, so long as there is only one such proxy device connected to the transparently-bridged LAN, or so long as no set of two or more of these devices can provide proxy services for a particular MAC address. Hence, only a single proxy device may provide proxy services for a transparently-bridged local area network segment, resulting in reliability concerns if the proxy device fails. As such, failure of a single network device such as the proxy could result in a loss of connectivity from a large number of end stations. However, efforts at improving network reliability by adding a redundant proxy seem unattainable as it violates the basic design assumption of transparent bridging, since the added proxy would give the appearance of providing two separate paths to a single resource in a transparent bridged network.

This problem is readily apparent from the example of a proxy device being unable to determine whether an incoming frame originated from an end station on the local LAN, or originated from a second proxy device on that same LAN. This results in two separate problems. First, assuming the proxy device uses source address information from the packet to "learn" the location of the source device using that MAC address (as a transparent bridge normally does), this could cause the source proxy device to mistakenly conclude that the source device was attached to the local LAN, when in fact the source device is attached to a completely different LAN that is reachable by the second proxy device via a wide area network. This could cause the proxy device to make an incorrect forwarding decision for future packets.

In addition, if the received frame is a type to "explore" for a certain device device (e.g., LLC1 TEST frame, NetBIOS Name Query frame, etc.) and it originated from another proxy on the network, the receiving proxy device, believing the frame to have been generated locally, may forward the explore frame back to the remote LAN which originated the explorer frame; at best this is wasteful of proxy processor and bandwidth resources, and at worst this could result in an "explorer loop", where the same explorer frame circles continuously across the wide area network, using vast amounts of local and wide area network resources and risking a system-wide crash.

SUMMARY OF THE INVENTION

There is a need for an arrangement in a transparently-bridged wide area network, where proxy devices attached to the same LAN can effectively learn the location of a device by its MAC address, without generation of errors due to the presence of multiple proxy devices.

There is also a need for an arrangement enabling explorer frames to be used by end stations for location of other end stations, without the occurrence of explorer looping in local area networks having multiple proxy devices coupled to a local area network, for communication with other proxy devices across a wide area network.

There is also need for an arrangement where proxy devices can distinguish between explorer frames originated from an end station on a transparent bridging domain, as opposed to other proxy devices coupled to an associated local area network.

These and other needs are obtained by the present invention, where an address substitution is performed in a frame, received by a proxy device from a wide area network, for transmission onto a local area network having multiple proxy devices. Hence, proxy devices connected to the same local area network may distinguish between frames output by another proxy device and frames generated by end stations on the local area network.

According to one aspect of the present invention, a method is provided of determining a reachability between first and second end stations coupled to respective first and second local area networks. The method includes outputting from the first end station onto the first local area network a first frame having a source address identifying the first end station and a destination address identifying the second end station. The first frame is received by first and second proxy devices coupled to the first local area network. The first frame is sent by the first and second proxy devices, via a wide area network, to respective third and fourth proxy devices coupled to the second local area network. Each of the third and fourth proxy devices outputs a modified first frame onto the second local area network for reception by the second end station. In particular, the modified first frame is generated by replacing the source address identifying the first end station in the first frame with a new source address identifying the corresponding proxy device. The replacement of the source address with a new source address identifying the corresponding proxy device enables the third and fourth proxy devices to be able to identify that the modified first frame detected on the second local area network was generated by another proxy device, as opposed to an end station on the second local area network. Hence, the duplicate generation of frames across the wide area network is eliminated, providing a robust and stable internetworking system that enables multiple proxy devices to be connected on a single local area network.

Another specific feature of this aspect is the selective processing of frames or response frames received by a proxy device based on a detected correlation between the received frame and information stored in caches or databases associated with processing states in the network. For example, any frame received by a proxy device on a local area network is compared to a proxy list to determine if the source address of the received frame corresponds to another proxy device, enabling the proxy device having received the frame to distinguish between frames generated by end stations and frames forwarded by proxy devices on the local area network. In addition, each proxy device includes an associated pending request database, enabling the proxy device to associate a response frame to a pending request issued by the proxy device. As such, this aspect enables each of the proxy devices to maintain an inventory of outstanding requests, such that a remote reachability cache is updated only if a response frame is associated with a previously-submitted frame. Hence, the possible generation of loops within the wide area network is eliminated by selective generation of the response frame in the proxy devices based on stored requests in the pending request database.

Another aspect of the present invention provides an internetworking system including a wide area network, a first local area network, and a second local area network. The first local area network includes (1) a first end station configured for outputting a first frame having a source MAC address identifying the first end station and a destination MAC address, and (2) first and second proxy devices coupled to the first local area network for outputting the first frame as first and second canureach frames onto the wide area network, respectively, based on the destination MAC address. The second local area network includes (1) a second end station having a MAC address corresponding to the destination MAC address of the first frame, (2) a third proxy device configured for outputting a first modified frame onto the second local area network, having a MAC address of the third proxy device as the corresponding source MAC address and the MAC address of the second end station as the corresponding destination MAC address, in response to reception of the first canureach frame, and (3) a fourth proxy device configured for outputting a second modified frame onto the second local area network, having a MAC address of the fourth proxy device as the corresponding source MAC address and the MAC address of the second end station as the corresponding destination MAC address, in response to reception of the second canureach frame.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numerals represent like elements throughout and wherein.

BEST MODE FOR CARRYING OUT THE INVENTION

Figure 2:
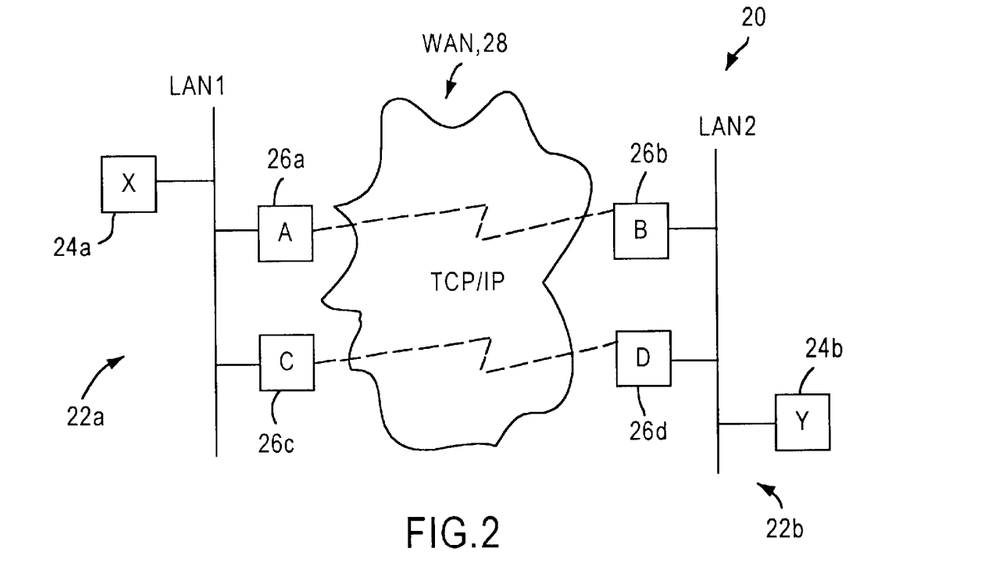
FIG. 2 is a block diagram of an arrangement for interconnecting local area networks across a wide area network using multiple proxy devices according to an embodiment of the present invention.

FIG. 2 is a block diagram illustrating an internetworking system 20 for communication of end stations across a wide area network according to an embodiment of the present invention. As shown in FIG. 2, the internetworking system 20 includes a first local area network 22a and a second local area network 22b. Each local area network 22 typically includes end stations 24, and at least two proxy devices 26 coupled to the corresponding local area network 22 for communication across the wide area network (WAN) 28. For example, proxy devices 26a and 26c are coupled to LAN 22a, whereas proxy devices 26b and 26d are coupled to LAN 22b. According to the disclosed embodiment, the LANs 22a and 22b are Ethernet IEEE 802.3-based local area networks. Hence, data packets transmitted on the LANs 22 have a source address and destination address, but no RIF field as found in token ring IEEE 802.5 networks.

As shown in FIG. 2, each proxy device 26 is configured for communication with another proxy device 26 in another network 22. For example, proxy device 26a is configured for communication via WAN 28 with proxy device 26b, and proxy device 26c is configured for communication with proxy device 26d via the WAN 28. As such, proxy devices 26a and 26b are configured as peers across WAN 28, and proxy devices 26c and 26d are configured as peers across WAN 28. Each proxy device 26 may have multiple peers for communication with respective LANs.

According to the disclosed embodiment, each proxy device 26 is configured as a data link switching (DLSw) device, also referred to as a DLSw router, for transporting information between local area networks 22a and 22b according to the Internet Engineering Task Force (IETF) Request For Comments (RFC 1795).

The DLSw operational process involves three basic components, namely capabilities exchange, circuit establishment, and flow control. Capabilities exchange involves the trading of information about capabilities associated with a proxy device session. The exchange of information is negotiated when the session is initiated and during the course of session operations. Circuit establishment occurs between end systems, for example between nodes 24a and 24b, and includes locating the target end system and setting up data-link control connections between each end system (e.g., end station 24a) and its local router (e.g., proxy device 26a). DLSw flow control enables the establishment of independent, unidirectional flow control between DLSw partners 26a and 26b, or partners 26c and 26d.

As described above, the disclosed embodiment is directed to DLSw circuit establishment between a pair of end systems 24a and 24b. Conventional systems assume that one and only one router 26 is connected to any local area network 22; if an additional router was added to the network 22, then a "loop" may be generated across the internetwork, possibly resulting in a network unavailability. Hence, if conventional DLSw routers were implemented as proxy devices 26, there would be a concern that any explorer frame output by end station 24a would cause a loop in the wide area network 28. For example, assume proxy devices 26a and 26c receive a test message from the end station 24a via the local area network 22a that specifies "X" as a source address and "Y" as a destination MAC address for end station 24b. Each proxy device 26a and 26c sends its own "canureach" frame to its respective peer 26b and 26d via the WAN 28. Proxy devices 26b and 26d, in turn, output the test message on local area network 22b. However, since use of the spanning tree algorithm may not be effective in this example due to the presence of multiple proxy devices on a single LAN, the proxy devices 26b and 26d cannot identify each other's test frames as duplicative. In other words, the proxy devices 26b and 26d in this example cannot determine whether a test frame detected on the network 22b originated from an end station on network 22b having a source address "X", as opposed to the test frame forwarded by the proxy devices 26b or 26d from the WAN 28, especially since the data packet lacks any routing information field (RIF) that identifies its path.

According to the disclosed embodiment, all DLSw routers 26 sharing a particular LAN segment (e.g., 22b) teach each other their MAC addresses that operate on that LAN segment. Hence, proxy device 26b would recognize the MAC address of proxy device 26d on LAN segment 22b, such that a data packet having a source MAC address of "D" corresponds to a data packet output by proxy device 26d, as opposed to an end station on LAN 22b. Hence, proxies 26a and 26c advertise their presence to each other by sharing their respective MAC addresses and by identifying themselves as DLSw proxy devices. This exchange of MAC address information is distinct from the conventional DLSw capabilities exchange, where link partners exchange capabilities information according to SSP protocol. Rather, the disclosed sharing of MAC addresses occurs between proxy devices 26a and 26c via LAN 22a, and between proxy devices 26b and 26d via LAN 22b.

Figure 3:
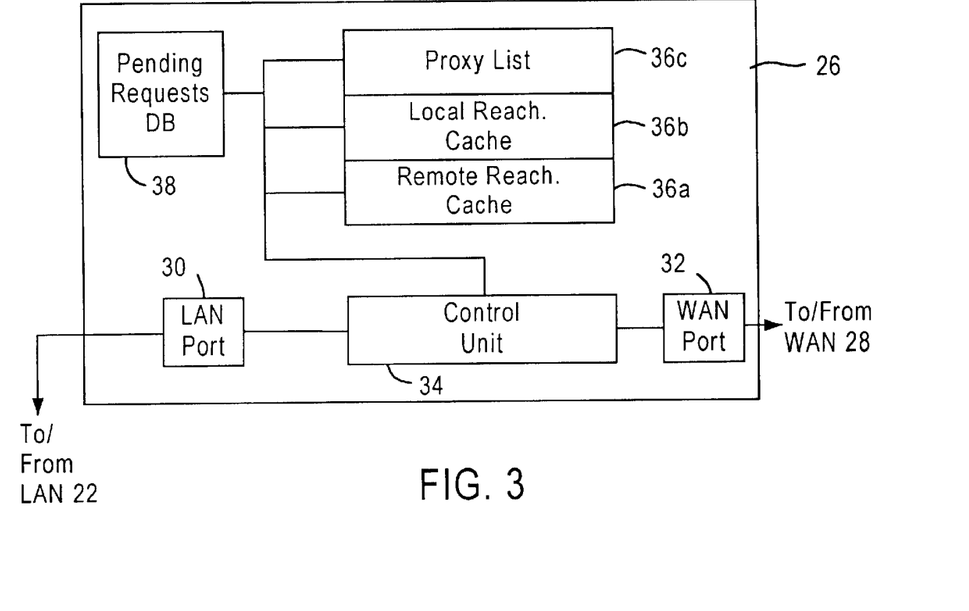
FIG. 3 is a block diagram illustrating in detail the proxy device of FIG. 2.

FIG. 3 is a block diagram illustrating a proxy device 26 according to an embodiment of the present invention. The proxy device 26 is preferably implemented as a DLSw router configured in accordance with RFC 1795. The proxy device includes a LAN port 30 for sending and receiving data from network nodes for an associated LAN 22 according to the local area network protocol, for example Ethernet/ IEEE 802.3 protocol.

The proxy device 26 also includes a wide area network port 32 for sending and receiving messages onto the wide area network 28 using TCP/IP protocol. The proxy device 26 also includes a controller 34, and caches 36 that store addressing information for different network nodes that are reachable by the proxy device 26. The proxy device 26 also includes a pending request database 38, described below. The remote reachability cache 36a stores MAC addresses corresponding to end stations 24 that are reachable only via the WAN 28. The local reachability cache 36b stores MAC addresses corresponding to end stations 24 the are reachable via the associated local area network 22. Hence, proxy devices 26a and 26c would store the MAC address ("X") for end device 24a in their respective local reachability caches 36b. The proxy list 36c stores the addresses of all reachable proxy devices 26, including actual connection peers as well as other proxy devices connected to the same local area network 22. For example, the proxy device 26a will store in its proxy list 36c the MAC address for proxy device 26c, and well as the network address for its corresponding peer 26b. Hence, the controller 34 can effectively identify network nodes that are reachable via the local area network 22, the wide area network 28, and whether any of those network nodes are end stations 24 or other proxy devices 26.

As described above, the disclosed arrangement is directed to preventing the looping of explorer frame in a transparent bridging domain with multiple entry points. This is accomplished by a MAC address substitution performed by a proxy device 26 when transmitting a frame to, or receiving a frame from, a transparently-bridged LAN. Assuming that the proxy devices 26 have learned the MAC addresses of any other proxy devices coupled to the same network and stored those addresses in their respective proxy lists 26, the MAC address substitution performed by the proxy device 26 enables all other proxy devices on the same LAN 22 to distinguish between data frame generated by a new end station on the corresponding local area network and frames generated by a remote end station and received by the transmitting proxy device 26 via the WAN 28.

Figure 4:
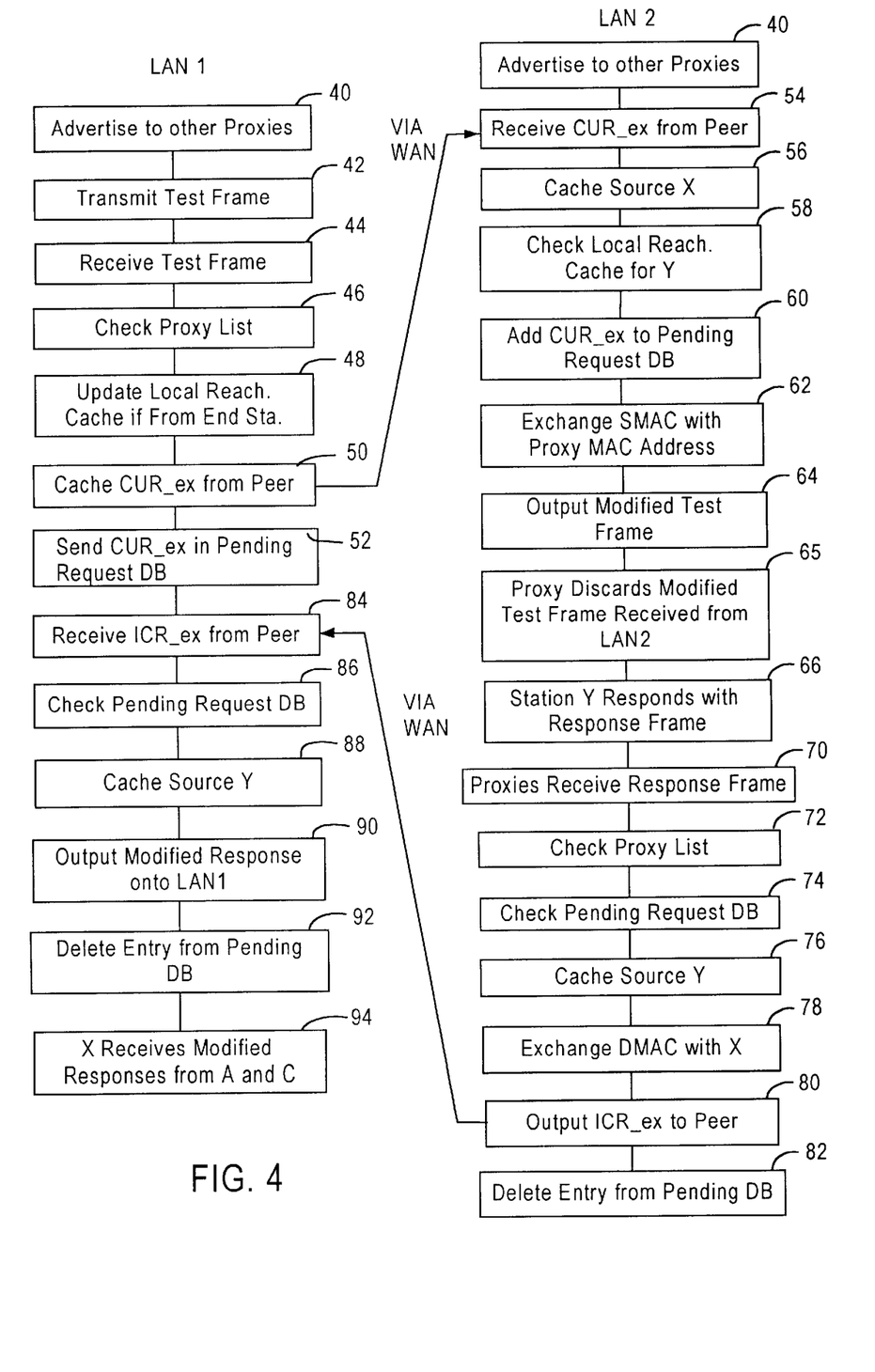
FIG. 4 is a flow diagram illustrating the method for determining the reachability of end stations coupled to respective local area networks according to an embodiment of the present invention.

FIG. 4 is a flow diagram illustrating the method for determining a reachability between first and second end stations 24 according to an embodiment of the present invention. As shown in FIG. 4, each of the proxies 26a, 26b, 26c and 26d advertise their respective MAC addresses in step 40. Each proxy 26 may advertise its associated MAC address to other proxy devices 26 on the same LAN 22 by either a MAC-level multicast transmission, or by logical link control (LLC) type 1 (LLC1) messages. Assuming all proxy devices 26 received frames destined to the same multicast MAC address, the proxy devices 26 should be able to easily learn the MAC address as being used by all other proxy devices on the LAN 22.

The method then continues by the transmission of a test frame in step 42, for example, by end station 24a having MAC address "X". In particular, the end station 24a outputs a test frame having a source address identifying the first end station (e.g., "X") and a destination address "Y" identifying another end station 24b on a remote network 22b. Both proxy devices 26a and 26c receive the test frame from the local area network 22a in step 44. Upon receiving the test frame from the end station 24a, each of the proxy devices 26a and 26c accesses its corresponding proxy list 36c to confirm that the test frame is from an end station 24a on the LAN 22a and not from another proxy device 26 on the LAN 22a. If a proxy device (e.g., 26a) determines that the test frame is from another proxy device (e.g., 26c) on the same LAN 22, the proxy device (e.g., 26a) receiving the frame discards the frame.

After checking the associated proxy list 36c in step 46 and confirming that the test frame is not from another proxy device 26, the control unit 34 of the corresponding proxy device updates the corresponding local reachability cache 36b in step 48 with the source MAC address ("X") of the test frame corresponding to the end station 24a.

The control units 34 of the proxy device 26a and 26c check their respective remote reachability caches 36a to determine whether end station 24b having the MAC address "Y" is determined to be reachable. Since the MAC address "Y" is not initially present in the remote reachability cache 36a of proxy devices 36a and 36c, the control units 34 of the proxy devices 26a and 26c send the respective test frames via the WAN 28 to the proxy devices 26b and 26d in step 50, for example as "canureach" frames (CUR_ex). The control units 34 of proxy devices 26a and 26c also cache the canureach frame in their respective pending request databases 38 in step 52.

The proxy devices 26b and 26d receive the "canureach" frames from their respective peer devices 26a and 26c via the WAN 28 in step 54. Each "canureach" frame is uniquely identifiable by its MAC/SAP address pair, which includes source MAC and SAP addresses, plus destination MAC and SAP addresses. The control unit 34 of each proxy device 26b and 26d, in response to receiving the "canureach" frame, caches the source address "X" in the corresponding remote reachability cache 36a in step 56, and accesses the corresponding reachability cache 36b in step 58 to determine whether the destination address "Y" in the "canureach" frame is reachable. Assuming end station 24b has not previously output a data frame onto the LAN 22b, the local reachability caches 36b of proxy devices 26b and 26d will not have the MAC address "Y" for end station 24b.

Hence, each control unit 34 of proxy devices 26b and 26d adds the "canureach" frame to the associated pending request database 38 in step 60, and exchanges the source MAC in the test frame with the MAC address of the proxy device in step 62. For example, the control unit 34 of proxy device 26b will replace the source address "X" identifying end station 24a with a new source address "B" identifying the proxy device 26b to generate a modified test frame. Similarly, proxy device 26d generates its own modified test frame by replacing the source address "X" from the "canureach" frame with a new source address "D" identifying the proxy device 26d.

The proxy devices 26b and 26d then output their modified test frames onto the LAN 22b, having source MAC address "B" and "D", respectively, in step 64. As recognized in the art, the proxy devices 26b and 26d output their respective modified test frames onto the LAN 22b at different times in compliance with IEEE 802.3 CSMA/CD protocol.

Note that the proxy devices 26b and 26d will detect each other's test frames on the LAN 22b. However each proxy device (e.g., 26b) will determine that the source MAC address (e.g., "D") corresponds to the other proxy device identified in the proxy list, and therefore discard the test frame in step 65.

The end station 24b, in response to reception of the modified test frames from proxy devices 26b and 26d having the destination MAC address of "Y", responds to each of the two modified test frames by generating respective response frames in step 66. Hence, end station 24b responds to the modified test frame from proxy device 26b by outputting a first response frame having a source MAC address of "Y" and a destination MAC address of "B". End station 24b also responds to the modified test frame from the proxy device 26d by outputting a second response frame having a source MAC address of "Y" and a destination MAC address of "D".

The proxy devices 26b and 26d receive the first and second response frames in step 70 based on the correlation of the destination MAC addresses "B" and "D", respectively. Each control unit 34 of the proxy devices 26b and 26d on the LAN 22b checks its corresponding proxy list 36c in step 72, as described above with respect to step 46. The control unit 34 then checks the pending request database 38, and correlates the response frame from the end station 24b in step 74 with the stored "canureach" frame. For example, the control unit 34 of proxy device 26b correlates the first response frame with the "canureach" frame from proxy device 26a that is stored in its associated pending request database 38. Similarly, the control unit 34 of proxy device 26d correlates the second response frame from end station 24b with the "canureach" frame from proxy device 26c, stored in the associated pending request database 38.

In response to determining the correlation between the response frame and the "canureach" test frame, the control unit 34 in each proxy device 26b and 26d caches the source MAC address "Y" of the response frame in the local reachability cache 36b in step 76, and generates a modified response by replacing the destination address identifying the proxy device with the destination address "X" identifying the original requesting station 24a in step 78. Hence, proxy devices 26b and 26d replace the destination address "B" and "D", respectively, with destination address "X" identifying the originating end station 24b that transmitted the original test message. The proxy devices 26b and 26d output the respective modified response frames as "icanreach" frames (ICR_ex) to the respective DLSw peers 26a and 26c via the WAN 28 in step 80, and delete the respective "canureach" test frame entries from the respective pending request databases 38 in step 82.

The proxy devices 26a and 26c of LAN 22a, in response to receiving the respective first and second modified response frame in step 84, check the associated pending request databases 38 in step 86. Each control unit 34 of the corresponding proxy device 26 on LAN 22a correlates the received "icanreach" frame with the originally transmitted "canureach" frame based on the source and destination address, specifically the source MAC address "X" and the destination MAC address "Y" of the original test frame, as well the source SAP address and destination SAP address used by the DLSw partners 26.

In response to a correlation between the "canureach" frame stored in the pending request database 38 and the received "icanreach" frame received via the WAN, the control unit 34 of each proxy device 26a and 26c caches the source MAC address "Y" in the remote reachability cache 36a in step 88, outputs the modified response onto the LAN 22a in step 90 as a data packet having a source address "Y" and destination address "X", and deletes the test frame and/or "canureach" frame from the pending request database 38 in step 92. Hence, the end station 24a will receive a response frame from each proxy device 26a and 26c in step 94. In most cases the test frame originally sent by end station 24a has no critical data, hence the receipt of two responses to the test frame is inconsequential.

According to the disclosed embodiment, an address swapping arrangement enables a transparently bridged network to use multiple proxy devices connected to the same transparently-bridged local area network. Hence, the disclosed arrangement eliminates the problems normally encountered with relying on a single proxy device as a gateway to cross a wide area network. Hence, the disclosed arrangement provides a more robust and reliable network that permits the use of redundant peers.

In addition, the use of the proxy list and the pending request database enables the proxy device 26 to intelligently monitor the reception of test frames and response frames, as opposed to prior art arrangements that may otherwise automatically store source and destination addresses in the address lookup tables without regard to the consequences and network topology management.

Numerous modifications may be made to the disclosed embodiment while remaining within the scope of the invention. For example, different types of frames, such as UI frames, may be selectively processed by the proxy devices.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of determining a reachability between first and second end stations coupled to respective first and second local area networks, the method comprising:

outputting from the first end station onto the first local area network a first frame having a source address identifying the first end station and a destination address identifying the second end station;

receiving the first frame by first and second proxy devices coupled to the first local area network;

sending the first frame by the first and second proxy devices, via a wide area network, to respective third and fourth proxy devices coupled to the second local area network; and in each of the third and fourth proxy devices, outputting a modified first frame onto the second local area network for reception by the second end station, including generating the modified first frame by replacing the source address identifying the first end station in the first frame with a new source address identifying the corresponding proxy device.

2. The method of claim 1, further comprising:

outputting first and second response frames by the second end station onto the second local area network in response to reception of the modified first frames from the third and fourth proxy devices, respectively, the first and second response frames having destination addresses identifying the third and fourth proxy devices, respectively; and sending a modified first response frame by the third proxy device to the first proxy device via the wide area network, including generating the modified first response frame by replacing the destination address identifying the third proxy device in the first response frame with a destination address identifying the first end station.

3. The method of claim 2, further comprising sending a modified second response frame by the fourth proxy device to the second proxy device via the wide area network, including generating the modified second response frame by replacing the destination address identifying the fourth proxy device in the first response frame with a destination address identifying the first end station.

4. The method of claim 3, further comprising updating remote reachability caches in the first and second proxy devices, indicating the reachability of the second end station, in response to reception of the modified first response frame and the modified second response frame, respectively.

5. The method of claim 2, further comprising updating local reachability caches in the third and fourth proxy devices, indicating the reachability of the second end station, in response to reception of the first response frame and the second response frame, respectively.

6. The method of claim 2, wherein the first and third proxy devices are data-link switching (DLSw) peers, and the second and fourth proxy devices are DLSw peers.

7. The method of claim 6, wherein the step of outputting the first frame from the first end station includes outputting an explorer frame as a test frame and having a corresponding Media Access Control (MAC) address as the source address and a MAC address corresponding to the second end station as the destination address.

8. The method of claim 7, wherein the step of sending the test frame by the first and second proxy devices includes, for each of the first and second proxy devices, outputting a canureach frame having a first Media Access Control (MAC)/Service Access Point (SAP) address pair as the source address and a second MAC/SAP address pair as the destination address, the first MAC/SAP address pair including the MAC address of the first end station and the second MAC/SAP address pair including the MAC address of the second end station.

9. The method of claim 8, wherein the step of outputting a modified first frame includes replacing the MAC address of the first end station with a MAC address of the corresponding proxy device as the source address of the modified first frame.

10. The method of claim 9, further comprising storing in at least one of the third and fourth proxy devices the canureach frame in a local reachability cache.

11. The method of claim 10, further comprising comparing in the at least one proxy device the corresponding response frame from the second end station to the canureach frame stored in the local reachability cache, the step of outputting the corresponding modified response frame by the at least one proxy device including outputting an icanreach frame based on the comparison of the corresponding response frame and the stored canureach frame.

12. The method of claim 2, further comprising, in each of the third and fourth proxy devices, storing the received first frame in a pending request database, the step of sending a modified first response frame including: (1) determining a correlation between the received first frame stored in the pending request database of the third proxy device and the first response frame, and (2) generating the modified first response frame and updating a local reachability cache based on the detected correlation.

13. The method of claim 12, further comprising dropping the second response frame in the third proxy device based on a determined absence of any correlation between any request stored in the corresponding pending request database and the second response frame.

14. The method of claim 13, further comprising, in the first proxy device:

storing the first frame in a pending request database of the first proxy device in response to receipt of the first frame;

determining a correlation between the received first frame stored in the pending request database of the first proxy device and the modified first response frame received from the third proxy device; and updating a remote reachability cache in the first proxy device and outputting the modified first response frame onto the first local area network in response to the determined correlation between the received first frame and the modified first response frame.

15. An internetworking system comprising:

a wide area network;

a first local area network comprising:

(1) a first end station configured for outputting a first frame having a source MAC address identifying the first end station and a destination MAC address, and (2) first and second proxy devices coupled to the first local area network for outputting the first frame as first and second canureach frames onto the wide area network, respectively, based on the destination MAC address; and a second local area network comprising:

(1) a second end station having a MAC address corresponding to the destination MAC address of the first frame, (2) a third proxy device configured for outputting a first modified frame onto the second local area network, having a MAC address of the third proxy device as the corresponding source address and the MAC address of the second end station as the corresponding destination MAC address, in response to reception of the first canureach frame, and (3) a fourth proxy device configured for outputting a second modified frame onto the second local area network, having a MAC address of the fourth proxy device as the corresponding source address and the MAC address of the second end station as the corresponding destination MAC address, in response to reception of the second canureach frame.

16. The system of claim 15, wherein the second end station outputs first and second response frames onto the second local area network in response to reception of the first and second modified frames, the first and second response frames having destination MAC addresses identifying the third and fourth proxy devices, respectively.

17. The system of claim 16, wherein the third and fourth proxy devices, in response to receiving the first and second response frames, output first and second icanreach frames to the first and second proxy devices by replacing the destination MAC addresses identifying the third and fourth proxy devices, respectively, with the MAC address of the first end station as the corresponding destination address.

18. The system of claim 16, wherein the first and second proxy devices each have remote reachability caches, the first and second proxy devices updating the respective remote reachability caches with the MAC address of the second end station in response to reception of the first and second icanreach frames via the wide area network, respectively.

19. The system of claim 16, wherein the third and fourth proxy devices each have local reachability caches for storing the first and second canureach frames, respectively, the third and fourth proxy devices updating the respective local reachability caches with the MAC address of the second end station in response to a correlation between the received first and second response frames and the stored first and second canureach frames, respectively.

20. The system of claim 15, wherein the third and fourth proxy devices each include a proxy list for identifying proxy devices coupled to the corresponding second local area network, the third and fourth proxy devices selectively dropping the second and first modified frames upon reception thereof based upon a comparison of the respective source addresses and the respective proxy list.

21. The system of claim 16, wherein the third and fourth proxy devices each include a pending request database for storing the first and second canureach frames, respectively, the third and fourth proxy devices, in response to correlating the received first and second response frames with the first and second stored canureach test frames, outputting respective first and second icanreach frames to the first and second proxy devices by replacing the destination MAC addresses identifying the third and fourth proxy devices, respectively, with a MAC address of the first end station as the corresponding destination address.

22. A method in a proxy device coupled to a first local area network and configured for determining a reachability for a peer proxy device coupled to a second local area network, the method comprising:

receiving a first frame from the peer proxy device via a wide area network, the first frame having a source address identifying a source end station on the second local area network and a destination address identifying a destination end station on the first local area network;

generating a modified frame by replacing the source address in the first frame with a new source address identifying the proxy device; and outputting the modified frame onto the first local area network for reception by the destination end station.

23. The method of claim 22, further comprising:

receiving a response frame from the destination end station, the response frame including a second source address identifying the destination end station and a second destination address identifying the proxy device;

determining a correlation between the response frame and the modified frame;

generating a modified response frame, based on the determined correlation, by replacing the second destination address in the response frame with a new response destination address identifying the source end station; and outputting the modified response frame to the peer proxy device via the wide area network.

24. The method of claim 23, wherein the proxy device and the peer proxy device are data-link switching (DLSw) peers, the step of generating a modified frame including replacing a Media Access Control (MAC) address of the source end station as said source address with a MAC address of the proxy device as said new source address.

25. The method of claim 24, wherein:

the step of receiving the first frame includes receiving a canureach frame as said first frame; and the step of outputting the modified response frame includes outputting an icanreach frame as said modified response frame.

26. The method of claim 23, further comprising:

storing the first frame in a pending request database, the step of determining a correlation including determining a correlation between the response frame and the first frame stored in the pending request database; and deleting the first frame from the pending request database in response to the determined correlation between the response frame and the stored first frame.

27. A computer readable medium having stored thereon sequences of instructions for selectively establishing, by a proxy device coupled to a first local area network, a reachability for a peer proxy device coupled to a second local area network, the sequences of instructions including instructions for performing the steps of:

receiving a first frame from the peer proxy device via a wide area network, the first frame having a source address identifying a source end station on the second local area network and a destination address identifying a destination end station on the first local area network;

generating a modified frame by replacing the source address in the first frame with a new source address identifying the proxy device; and outputting the modified frame onto the first local area network for reception by the destination end station.

28. The computer readable medium of claim 27, further comprising instructions for performing the steps of:

receiving a response frame from the destination end station, the response frame including a second source address identifying the destination end station and a second destination address identifying the proxy device;

determining a correlation between the response frame and the modified frame;

generating a modified response frame, based on the determined correlation, by replacing the second destination address in the response frame with a new response destination address identifying the source end station; and outputting the modified response frame to the peer proxy device via the wide area network.

29. The computer readable medium of claim 28, wherein the proxy device and the peer proxy device are data-link switching (DLSw) peers, the step of generating a modified frame including replacing a Media Access Control (MAC) address of the source end station as said source address with a MAC address of the proxy device as said new source address.

30. The computer readable medium of claim 29, wherein:

the step of receiving the first frame includes receiving a canureach frame as said first frame; and the step of outputting the modified response frame includes outputting an icanreach frame as said modified response frame.

31. The computer readable medium of claim 28, further instructions for performing the steps of:

storing the first frame in a pending request database, the step of determining a correlation including determining a correlation between the response frame and the first frame stored in the pending request database; and deleting the first frame from the pending request database in response to the determined correlation between the response frame and the stored first frame.

32. A proxy device coupled to a first local area network and configured for determining a reachability for a peer proxy device coupled to a second local area network, the proxy device comprising:

a first network port for communication with a second proxy device via the first local area network;

a second network port for communication with the peer proxy device via a wide area network;

a database for storing a first frame, received from the peer proxy device and having a source address and a destination address, the source address identifying a source end station on the second local area network and the destination address identifying a destination end station on the first local area network; and a control unit configured for generating a modified frame by replacing the source address in the first frame with a new source address identifying the proxy device, the first network port outputting the modified frame onto the first local area network for reception by the destination end station.

33. The proxy device of claim 32, further comprising a remote reachability cache for identifying end stations reachable by the proxy device via the wide area network, the control unit storing the source address for the source end station in the remote reachability cache.

34. The proxy device of claim 33, further comprising a local reachability cache for identifying end stations reachable by the proxy device via the first local area network, the control unit storing a second source address identifying the destination end station in response to a response frame from the destination station having the second source address and a second destination address identifying the proxy device.

35. The proxy device of claim 34, wherein the control unit determines whether a correlation exists between the response frame and the first frame, the control unit generating a modified response frame, based on the determined correlation, by replacing the second destination address with the source address and outputting the modified response frame to the peer proxy device.

* * * * *